US010392257B2

(12) United States Patent
Morehouse et al.

(10) Patent No.: US 10,392,257 B2
(45) Date of Patent: Aug. 27, 2019

(54) METHOD FOR ENHANCING SODIUM BICARBONATE FLOWABILITY

(71) Applicant: SOLVAY SA, Brussels (BE)

(72) Inventors: Donald Morehouse, Grand Junction, CO (US); Julie Bauer, Grand Junction, CO (US); Jeremy Zollinger, Grand Junction, CO (US)

(73) Assignee: Solvay SA, Brussels (BE)

( * ) Notice: Subject to any disclaimer, the term of this patent is extended or adjusted under 35 U.S.C. 154(b) by 482 days.

(21) Appl. No.: 15/275,293

(22) Filed: Sep. 23, 2016

(65) Prior Publication Data

US 2017/0081203 A1   Mar. 23, 2017

Related U.S. Application Data

(60) Provisional application No. 62/222,772, filed on Sep. 23, 2015.

(51) Int. Cl.
*C01D 7/37* (2006.01)

(52) U.S. Cl.
CPC ...................... *C01D 7/37* (2013.01)

(58) Field of Classification Search
CPC ... C01D 7/00; C01D 7/35; C01D 7/37; C01D 7/38; C01D 7/40; C01D 7/42
See application file for complete search history.

(56) References Cited

U.S. PATENT DOCUMENTS

| 5,325,606 A * | 7/1994 | Liborius .................. B01J 8/005 165/104.16 |
| 6,284,288 B1 | 9/2001 | Gubelmann et al. |
| 6,699,447 B1 | 3/2004 | Nielsen et al. |
| 2016/0145115 A1 | 5/2016 | Savary |

FOREIGN PATENT DOCUMENTS

| JP | 2003-104722 A | 4/2003 |
| WO | WO 2011/161120 A1 | 12/2011 |
| WO | WO 2013/092754 A1 | 6/2013 |
| WO | WO 2014/207120 A2 | 12/2014 |
| WO | WO 2014/207123 A2 | 12/2014 |
| WO | WO 2014/207124 A2 | 12/2014 |

* cited by examiner

*Primary Examiner* — Daniel C. McCracken
(74) *Attorney, Agent, or Firm* — Beatrice C. Ortego

(57) ABSTRACT

A process for producing crystalline sodium bicarbonate, comprising: feeding dried sodium bicarbonate solids with a mass flow rate to a fluid bed cooling unit, wherein said cooling unit comprises at least one cooling element through which flows a cooling fluid; flowing a fluidization gas stream in the fluid bed cooling unit to fluidize the dried sodium bicarbonate solids, in order for the dried sodium bicarbonate solids to be in thermal contact with the at least one cooling element; withdrawing a sodium bicarbonate product from the fluid bed cooling unit; and adjusting the temperature of the cooling fluid flowing through the at least one cooling element in order for the sodium bicarbonate product to have an outlet temperature of 95° F. or less, preferably less than 90° F., when being withdrawn from the fluid bed cooling unit.

15 Claims, 2 Drawing Sheets

Bicarb Flow 1.0    Bicarb Flow 1.5    Bicarb Flow 2.0

Bicarb Flow 2.5    Bicarb Flow 3.0

METHOD FOR ENHANCING SODIUM BICARBONATE FLOWABILITY

CROSS-REFERENCE TO RELATED APPLICATIONS

The present application claims priority to U.S. provisional application No. 62/222,772 filed Sep. 23, 2015, the whole content of this application being incorporated herein by reference for all purposes.

TECHNICAL FIELD OF THE INVENTION

The invention relates to a process for producing crystalline sodium bicarbonate.

BACKGROUND OF THE INVENTION

Sodium bicarbonate ($NaHCO_3$) is a mild alkaline compound with a wide range of applications including uses in human food, animal feed, flue gas treatment, and chemical industries. World production of sodium bicarbonate in 2008 is estimated at 2.8 million tons. Most of its production derives from natural and synthetic sodium carbonate ($Na_2CO_3$). The production of sodium bicarbonate is mainly made by the carbonation of a sodium carbonate aqueous solution with gaseous $CO_2$. The sodium carbonate aqueous solution may come from purified sodium carbonate dissolved in water, or a from a partially decarbonated slurry of crude sodium bicarbonate from the Solvay process, or from a sodium carbonate solution taken out from a sodium carbonate crystallization unit fed with solutions deriving from trona or nahcolite ores.

Sodium bicarbonate is a product with a wide range of interesting properties and a very wide range of applications from high tech ingredients for the pharma industry to the human food and animal feed, and to the use in flue gas treatment. In flue gas treatment, sodium bicarbonate is most likely among the most efficient chemicals for the removal of a wide range of pollutants (most notably the acidic ones such as HCl and sulfur oxides). Its use is limited only by the competition of less efficient but much cheaper chemicals such as lime or even limestone.

The production of sodium bicarbonate is currently almost entirely made by the carbonation of sodium carbonate. In Europe, the carbonation is usually performed in situ in the soda ash plants from $CO_2$ coproduced during the production of soda ash (mainly the $CO_2$ generation in the lime kilns). In the United States, the carbonation is usually made in separate plants which purchase independently the soda ash and the $CO_2$ and combine them.

An alternative method for making sodium bicarbonate is by cooling crystallization of a liquor containing sodium bicarbonate. For example, U.S. Pat. No. 6,699,447 describes a sodium bicarbonate production from nahcolite. The method for producing sodium bicarbonate from a nahcolite deposit comprises injecting water or other aqueous solution at a temperature of at least 250° F. into the deposit, dissolving sodium bicarbonate in the hot water to form a production solution and subjecting the production solution to multiple stages of cooling crystallization. The sodium bicarbonate crystals may be dewatered and dried to form a commercial sodium bicarbonate product.

Under certain storage conditions, the sodium bicarbonate crystals can decompose into $CO_2$, water and sodium carbonate. This typically takes place at temperatures higher than 75° C. This sort of decomposition can cause the formation of sodium carbonate on the surface of particles. U.S. Pat. No. 6,284,288 relates to the use of silica as agent for controlling the thermal degradation of alkali metal, alkaline earth metal or ammonium bicarbonate.

One principal disadvantage to the use of sodium bicarbonate is its tendency to cake either by compaction or, more importantly, by exposure to high humidity conditions. The very high ability of bicarbonate to cake becomes increasingly marked as the particle size becomes finer. This in particular presents problems during the use of the sodium bicarbonate after a more or less lengthy storage.

In addition, commercially available sodium bicarbonate products have generally poor flow characteristics due to their normal particle size distributions and crystal shapes. The addition of flow aids to sodium bicarbonate to improve its flow and anti-caking properties is known.

There is continuing interest in the development of methods for providing sodium bicarbonate powders which remain in a free-flowing state, particularly when the powders normally flow poorly and/or are susceptible to agglomeration under ambient storage conditions of temperature and relative humidity. It is therefore necessary to be able to have available a sodium bicarbonate exhibiting a better stability on storage.

SUMMARY OF THE INVENTION

Accordingly, this invention aims at providing a process for preparing particulate sodium bicarbonate in a form which maintains its free-flowing properties when stored under ambient conditions of temperature and relative humidity.

The invention particularly relates to a method for enhancing the flowability of a particulate sodium bicarbonate product, the product made from this method and its use in various applications, in particular in animal feed and in technical grade.

An aspect of the present invention relates to a process for producing crystalline sodium bicarbonate, which comprises the following steps:
  feeding dried sodium bicarbonate solids with a mass flow rate to a fluid bed cooling unit, wherein said cooling unit comprises at least one cooling element through which flows a cooling fluid;
  flowing a fluidization gas stream in the fluid bed cooling unit to fluidize the dried sodium bicarbonate solids, in order for the dried sodium bicarbonate solids to be in thermal contact with the at least one cooling element;
  withdrawing a sodium bicarbonate product from the fluid bed cooling unit; and
  adjusting the temperature of the cooling fluid flowing through the at least one cooling element in order for the sodium bicarbonate product to have an outlet temperature of 95° F. or less (35° C. or less) when being withdrawn from the fluid bed cooling unit.

In an embodiment according to the present invention, the process further comprises the following steps:
  providing sodium bicarbonate wet solids recovered from a crystallization step; and
  drying the sodium bicarbonate wet solids to produce the dried sodium bicarbonate solids being directed to the fluid bed cooling unit.

In an embodiment according to the present invention, the process further comprises the following step:

classifying the sodium bicarbonate product after being withdrawn from the fluid bed cooling unit to generate at least two sodium bicarbonate products of different average particle size.

In an embodiment according to the present invention, the fluidization gas stream may contain carbon dioxide ($CO_2$), oxygen ($O2$), nitrogen ($N2$), air, an inert gas ('inert' meaning unreative with the sodium bicarbonate), or any combination of two or more thereof.

In an embodiment according to the present invention, the fluidization gas stream may comprise $N2$, $O2$, $CO_2$, or any combination thereof.

In an embodiment according to the present invention, the fluidization gas stream may comprise carbon dioxide ($CO_2$). In such embodiment, the fluidization gas stream may comprise more than 90% by volume of $CO_2$. Or the fluidization gas stream may consist essentially of $CO_2$ (at least 98% by volume of $CO_2$).

In some embodiment according to the present invention, the fluidization gas stream may comprise air. Or the fluidization gas stream may consist essentially of air (at least 98% by volume of air).

In some embodiment according to the present invention, the fluidization gas stream may comprise carbon dioxide ($CO_2$) and air.

In some embodiment according to the present invention, the fluidization gas stream may contain $CO_2$ and an inert gas ('inert' meaning unreative with the sodium bicarbonate).

In an embodiment according to the present invention, the dried sodium bicarbonate solids fed to the fluid bed cooling unit preferably have a temperature from 145° F. to 155° F. (from 62.8° C. to 68.3° C.).

In an embodiment according to the present invention, the sodium bicarbonate product has an outlet temperature of from 65° F. to less than 95° F. (from 18.3° C. to less than 35° C.).

In an embodiment according to the present invention, the cooling fluid is water or an aqueous solution.

In an embodiment according to the present invention, the cooling fluid comprises (or consists of) water or an aqueous solution at ambient temperature when the ambient temperature is 90° F. or less (32.2° C. or less).

In an embodiment according to the present invention, the cooling fluid entering through the at least one cooling element has a temperature from 35° F. to 90° F. (from 1.7 to 32.2° C.).

In an embodiment according to the present invention, the cooling fluid entering through the at least one cooling element is at ambient temperature, and wherein when the ambient temperature is higher than what is required to maintain the outlet temperature of the withdrawn sodium bicarbonate product to be 95° F. or less, the cooling fluid is pre-cooled in a heat exchanger to decrease its temperature before it flows through the at least one cooling element.

In an embodiment according to the present invention, adjusting the temperature of the cooling fluid flowing through the at least one cooling element is dependent on at least one parameter selected from the group consisting of:
the mass flow rate of the dried solids,
the ambient temperature surrounding the fluid bed, and
the temperature of the fluidization gas stream entering the fluid bed cooling unit.

In an embodiment according to the present invention, the fluid bed cooling unit comprises low humidity. Humidity is generally expressed in percentage of relative humidity. The temperatures of the atmosphere and the water surface determine the equilibrium vapor pressure. At 100% of relative humidity, the partial pressure of the water vapor is equal to the equilibrium vapor pressure, also called complete saturation. At a saturated atmospheric atmosphere at a temperature of 30° C., 30 grams of water can be stored in one cubic meter of air (0.03 ounce per cubic foot). In preferred embodiments, the relative humidity in the fluid bed cooling unit may be less than 50%, preferably 40% or less, or even preferably 30% or less, or more preferably 20% or less, or most preferably 10% or less.

Another embodiment of the present invention relates to a particulate sodium bicarbonate product made according to the sodium bicarbonate production process.

The particulate sodium bicarbonate product made by the production process according to the invention has an improved flowability compared to a particulate sodium bicarbonate product made by a production process which omits a fluid bed cooling unit which is downstream of a dryer and which is fed with the collected dried solids.

Another aspect of the present invention concerns also a food grade product comprising or consisting essentially of the crystalline sodium bicarbonate product according to the invention.

Yet another aspect of the present invention concerns also a technical grade product comprising or consisting essentially of the crystalline sodium bicarbonate product according to the invention. The crystalline sodium bicarbonate product may be used in a process for the removal of pollutants from gases.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

The present invention relates to the production of crystalline sodium bicarbonate.

The process of the present invention can be illustrated by reference to the operations and flow streams depicted schematically in FIG. 1.

Figure 1:
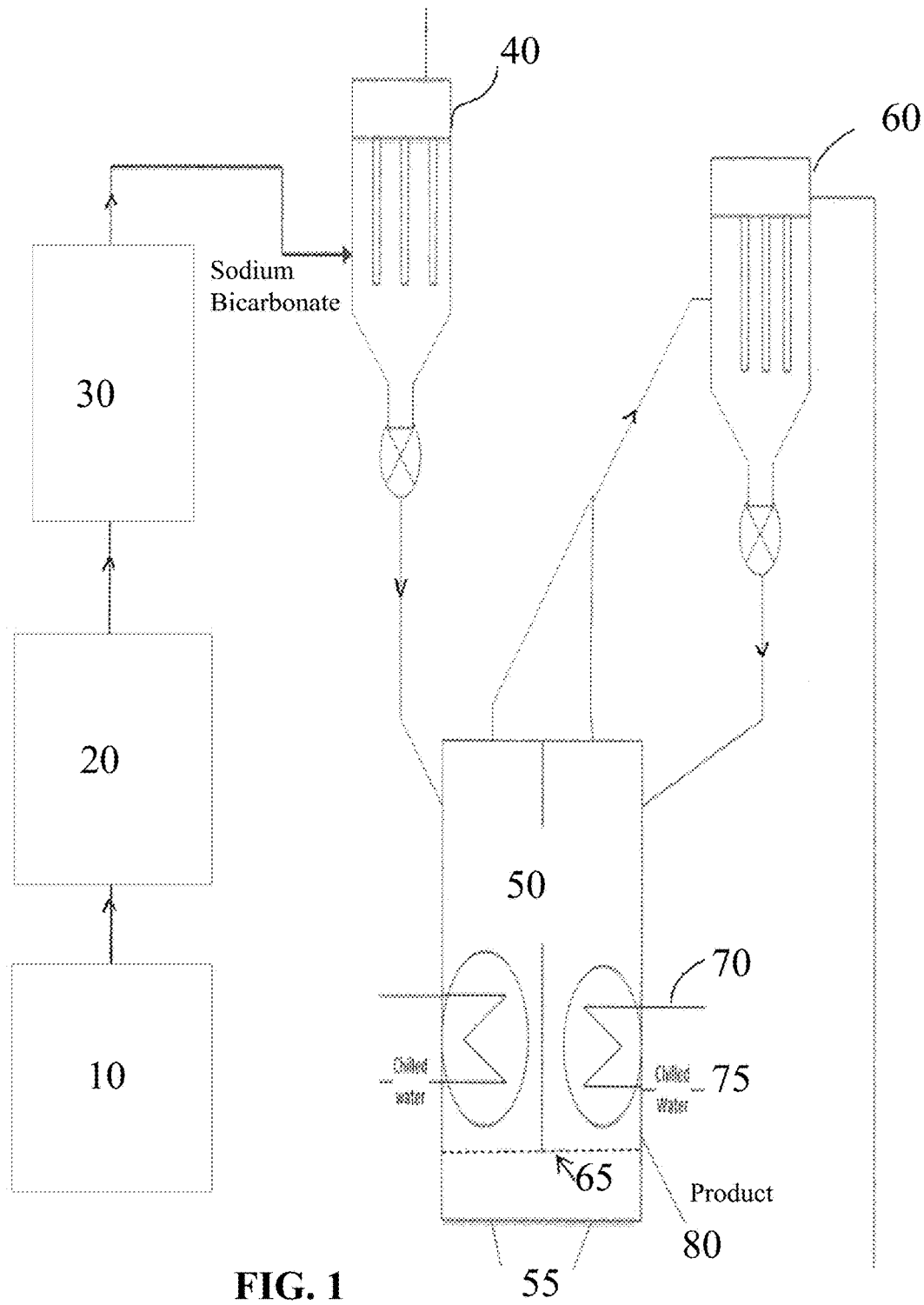
FIG. 1 illustrates a simplified process flow diagram for a sodium bicarbonate production process according to an embodiment of the present invention.

FIG. 1 represents a system for producing sodium bicarbonate which comprises a crsytallizer 10, a liquid/solid separation unit 20, a drying unit 30, a solids recovery system 40, a fluid bed cooling unit 50 in fluid communication with a secondary solids recovery system 60.

In a most preferred embodiment, sodium bicarbonate crystals in solution (slurry) exiting a crystallizer 10 are first separated using liquid/solid separation unit 20.

The crystallizer 10 is preferably a reaction crystallization unit. An aqueous solution comprising sodium carbonate is put into contact, in the reactive crystallization unit 10, with a feedgas comprising $CO_2$, in order to produce a water suspension comprising sodium bicarbonate crystals. To that end, it is recommended that the feedgas comprises at least 20% in weight, advantageously at least 40%, preferably at least 60%, more preferably at least 80% $CO_2$. It is particularly efficient to use pure (100%) $CO_2$. It is also recommended to use a well stirred gas-liquid reactor (as the reactive crystallization unit), comprising a gas injector able to distribute the feedgas homogeneously into the reactor. The liquid constitutes advantageously the continuous phase inside the reactor, the feedgas being injected at the bottom and moving upwards. The reactor preferably comprises cooling means, to counteract the exothermicity of the reaction of sodium carbonate with $CO_2$.

The temperature inside the reactive crystallization unit 10 may be between 60 and 85° C., or between 65 and 80° C. The temperature inside the reactive crystallization unit 10 is preferably between 65 and 85° C., more preferably between 70 and 80° C.

The operating pressure inside the reactive crystallization unit 10 may be from atmospheric pressure up to 90 psia (from 101 to 9,120 kPa). It is preferable for the operating pressure to be at least slightly above atmospheric pressure, such as between 1.02 and 2 atmospheres (between 15 and 29.4 psia; or between 103 and 203 kPa). The operating pressure is more preferably between 17 psia and 27 psia (between 117 and 186 kPa).

In order to obtain a water suspension comprising enough sodium bicarbonate crystals, it is preferable to maintain a residence time in the reactive crystallization unit 10 greater than 10 minutes, more preferably greater than 20 minutes. Generally, the liquid residence time may be from 60 to 600 min, preferably from 120 to 420 minutes, more preferably from 180 to 360 minutes.

The crystallization process may reach approximately from 15% to 20% in apparent settled volume.

In some embodiments, a crystal modifier additive may be added to the sodium carbonate-containing aqueous solution to be fed to the reactive crystallization unit 10 used for the reactive crystallization step or may be added directly to the reactive crystallization unit 10. A crystal modifier additive may also be called "crystal habit modifier" or "crystallization-modifying agent". In some embodiments in which the crystal modifier additive is used in the reactive crystallization step, a crystal modifier additive may be added to the sodium carbonate-containing liquor to be fed to the reactive crystallization unit (either in the liquor stream feeding the reactive crystallization unit 10 or in a holding tank in which the liquor is stored before being fed to the reactive crystallization unit 10) and/or added directly to the reactive crystallization unit.

Examples of suitable crystallization-modifying additives may be found for example in WO2011/161120A1 (or U.S. Pat. No. 8,865,096), WO2013/092754A1 (or US2015/037583), WO2014/207120A2, WO2014/207123A2, and WO2014/207124A2, all by SOLVAY SA, each of which is incorporated herein by reference.

When a crystallization-modifying agent is used in the crystallization step, the additive preferably contains Ca and/or Mg, more preferably contains Ca.

The formation of the sodium bicarbonate crystals preferably takes place in the presence of an added alkaline earth metal salt. An alkaline earth-containing salt, such as containing Ca, may be added to the liquor fed to the reactive crystallization unit 10 or may be added directly to the reactive crystallization unit while the monohydrate purge is separately fed to the reactor. A preferred Ca-containing salt to be used as crystallization-modifying agent is calcium chloride. An aqueous solution of calcium chloride is preferred, such as a 30% by weight calcium chloride aqueous solution. Calcium may be used during the formation of crystalline sodium bicarbonate so as to reach an amount from 30 to 200 mg Ca per kg of sodium bicarbonate particles produced, preferably from 50 to 180 mg Ca per kg sodium bicarbonate particles produced, more preferably from 70 to 110 mg Ca per kg sodium bicarbonate particles produced. The addition of Ca may be carried to change the mean particle size, in that the greater the amount of Ca in the slurry in the cooling crystallization unit or in a suspension in the reactive crystallization unit (gas-liquid reactor), the greater the particle size of sodium bicarbonate.

The liquid/solid separation unit 20 may comprise any suitable solid-liquid separation unit which is suitable to separate the solids from the liquid phase in the crystal slurry stream. The separation unit may comprise for example at least one cyclone, at least one centrifuge, at least one filter, at least one settling tank, or any combination of two or more thereof. The liquid/solid separation unit 20 preferably comprises at least one hydrocyclone in series with a centrifuge; that is to say, a solids-enriched stream exiting the at least one cyclone is fed to at least one centrifuge for the solids to be further separated.

The wet solids exiting the liquid/solid separation unit 20 are dried in a drying unit 30. The drying unit 30 may be a tray-type or fluidized-bed or flash drying unit. Drying may be at a ternpertaure generally less than 80° C., preferably from 50° C. to 90° C., more preferably from 60° C. to 80° C., yet more preferably from 60° C. to 70° C., most preferably from 62° C. to 68° C. Since the sodium bicarbonate crystals decompose at temperatures higher than 75° C. (into $CO_2$, water and sodium carbonate), the residence time during drying should be as short as possible. For that reason, a flash dryer (which is typically a vertical tube drier) may be preferred for its short residence time. A flash dryer offers an effective method of removing surface or unbound moisture from wet solids. Because the flash drying employs a low residence time within the drying unit, the unbound moisture is "flashed" off the solids.

The dried solids preferably exit the drying unit 30 at a temperature from 60° C. to 70° C. (from 140° F. to 158° F.), more preferably from 62.7° C. to 68.3° C. (from 145° F. to 155° F.).

The moisture content of the dried solids exiting the drying unit 30 should be low after drying, for example below 2 weight %, preferably below 1 weight or more preferably below 0.5 weight %, or most preferably below 0.2 weight %.

The dried solids enters the solids recovery system 40 (preferably a baghouse) where moist air is separated from the sodium bicarbonate solids. The recovered sodium bicarbonate solids then enter a fluid bed cooling unit 50. The collected dried solids are preferaby gravity fed to the fluid bed cooling unit 50.

The fluidization of solids inside the fluid bed cooling unit 50 is accomplished by circulating a fluidization gas stream 55. The fluidization gas stream 55 is preferably injected via a distribution plate 65 located at the botom of the fluid bed cooling unit 50. The fluidization gas stream 55 is preferably moved via a fan. Because the fluidization gas stream 55 exiting the cooling unit is recycled to the fluid bed cooling unit 50, and because the fan could stall from the presence of solids in the recycled fluidization gas stream 55, the fluidization gas stream 55 exiting the top of the fluid bed cooling unit 50 is passsed through the secondary solids recovery system 60, where the solids are collected. The collected solids are generally returned to the fluid bed cooling unit 50, and the solids-free fluidization gas stream is then returned to the distribution plate 65.

In an embodiment according to the present invention, the fluidization gas stream may contain carbon dioxide ($CO_2$), oxygen ($O_2$), nitrogen ($N_2$), air, an inert gas ('inert' meaning unreative with the sodium bicarbonate), or any combination of two or more thereof.

The fluidization gas stream 55 may comprise $N_2$, $O_2$, $CO_2$, or any combination thereof.

When the fluidization gas stream 55 may comprise carbon dioxide ($CO_2$), the fluidization gas stream 55 may comprise more than 90% by volume of $CO_2$; or the fluidization gas stream 55 may consist essentially of $CO_2$ (at least 98% by volume of $CO_2$).

In some embodiment, the fluidization gas stream 55 may comprise air; or the fluidization gas stream 55 may consist essentially of air (at least 98% by volume of air).

In other embodiment, the fluidization gas stream 55 may comprise carbon dioxide ($CO_2$) and air.

In some embodiment, the fluidization gas stream 55 may comprise $CO_2$ and an inert gas ('inert' meaning unreative with the sodium bicarbonate).

When the fluidization gas stream 55 may comprise carbon dioxide ($CO_2$), the $CO_2$ source may have different origins. In one recommended embodiment, the $CO_2$ may originate from a pure liquidified $CO_2$ source, from natural gas separation or from combustion of one or more hydrocarbonaceous material such as in a natural gas plant, after having been concentrated for example through an amine process. The $CO_2$ may be produced by indirect calcination of a composition releasing $CO_2$ upon calcination, preferably a composition comprising an alkali bicarbonate, more preferably sesquicarbonate or trona. Preferably, the $CO_2$ may originate from a process which makes soda ash, for instance $CO_2$ generated in calciners used to calcine trona ore.

The fluidization gas stream 55 before entering in the fluid bed cooling unit 50 preferably has a low relative humidity. The fluidization gas stream 55 may be less than 10%, preferably 5% or less of relative humidity, or even preferably 3% or less of relative humidity, or more preferably 2% or less of relative humidity, or most preferably 1% or less of relative humidity.

In the case of high atmospheric humidity or if at least a component of the fluidization gas stream 55 orignates from a humid environment, it may be advantageous to dry that specifc component or the entire fluidizing gas stream 55 before it is fed into the fluid bed cooling unit 50. The drying of the fluidizing gas stream 55 or its component(s) should provide a low relative humidity in the entire fluidizing gas stream 55 as described above.

The fluid bed cooling unit 50 preferably has a low relative humidity. The relative humidity in the fluid bed cooling unit 50 may be less than 50%, preferably 40% or less, or even preferably 30% or less, or more preferably 20% or less, or most preferably 10% or less. In some embodiments, the fluid bed cooling unit 50 may have 5% or less of relative humidity, or even preferably 3% or less of relative humidity, or more preferably 2% or less of relative humidity, or most preferably 1% or less of relative humidity.

The sodium bicarbonate solids preferably make several passes through the fluid bed cooling unit 50. The sodium bicarbonate solids are cooled with tube bundles 70 (cooling element) located in the fluid bed cooling unit 50. A cooling fluid 75 flows through the tube bundles 70. The solids make contact with the outer surface of these cooling elements and get cooled by heat transfer. A level of sodium bicarbonate solids is maintained in the fluid bed cooling unit 50 to insure that the tube bundles 70 are covered with the fluidized sodium bicarbonate solids.

The exit temperature of the sodium bicarbonate product 80 from the fluid bed cooling unit 50 is maintained at a temperature of 35° C. or less (95° F. or less), preferably at a temperature less than 35° C. (95° F.), more preferably at a temperature of 32.2° C. or less (90° F. or less), or less than 32.2° C. (90° F.). Optimal flowability performance is accomplished when the sodium bicarbonate product 80 is withdrawn from the cooling unit 50 with an exit temperature to less than 90° F. The product may be transported to storage or to a classification area to separate small and large particles from one another.

The sodium bicarbonate production process according to the invention allows to generate an excellent flowability of the product in form of powder.

The sodium bicarbonate product may contain calcium in an amount of at least 30 ppm Ca; or at least 50 ppm Ca; or at least 60 ppm Ca, or at least 70 ppm Ca. Values of calcium content in the sodium bicarbonate product may be at most 250 ppm Ca, or at most 225 ppm Ca, or at most 200 ppm Ca, or at most 180 ppm Ca, or at most 150 ppm Ca, or at most 125 ppm Ca, or at most 115 ppm Ca. Preferred ranges of Ca content inside the polycrystalline structure of the sodium bicarbonate product may be from 30 to 250 ppm Ca; or from 30 to 200 ppm Ca; or from 50 to 180 ppm Ca; or from 60 to 90 ppm Ca; or from 60 to 80 ppm Ca.

In preferred embodiments, the crystalline sodium bicarbonate product may contain sodium carbonate, generally in a low amount up to 2% by weight of sodium carbonate, preferably 1% by weight or less of sodium carbonate. A typical range of sodium carbonate content in the crystalline sodium bicarbonate product may be between 0.2 and 0.7% by weight of sodium carbonate.

The sodium bicarbonate product is preferably free of a flow aid additive. For example, the sodium bicarbonate product may be free of an alkaline earth phosphorous-containing compound used as a flow aid agent (such as tricalcium phosphate) and/or may be free of a silica-based coumpound used as flow aid agent, such as free of hydrophobic silica, silica gel, or nanosized silica. That is to say, no flow aid additive (such as a silica-based coumpound) is added to the sodium bicarbonate product during its manufacture or afterwards, such as in the dryer or in the cooling fluidized bed, or during storage.

The sodium bicarbonate product may contain optional ingredients such as about 0.1-5 weight percent of an anti-caking agent or desiccant, based on the weight of sodium bicarbonate. Examples of anti-caking agents may be magnesium silicate, calcium silicate, a stearate, bentonite, magnesium phosphate, and the like. Examples of desiccants may be activated alumina, calcium chloride, zinc chloride, dehydrated borax, and the like. In alternate embodiments, the sodium bicarbonate product may be free of an anti-caking agent or desiccant, thatis to say, the sodium bicarbonate product does not contain an anti-caking agent or desiccant.

In preferred embodiments, the sodium bicarbonate product does not contain another particulate inorganic compound with which it is blended. For example, the sodium bicarbonate product should not contain discrete and separate particles of silica and/or silicates in the sodium bicarbonate product. That is to say, the sodium bicarbonate product consists of a single population of particles, each particle preferably containing more than 98% $NaHCO_3$.

The sodium bicarbonate particles may comprise more than 99% $NaHCO_3$.

Following the cooling step, a stage screening (classifying or sieving) may be used in order to classify the sodium bicarbonate crystals, those in various sizes according to the specifications set by the market. Three distinct classes of refined sodium bicarbonate product may be obtained as pharmaceutical grade, feed grade and technical grade. Standard grades of sodium bicarbonate and special grades are manufactured to meet customers' specific requirements, and particle size is the major determinant of grades. Powdered #1 and fine granular #2 have a wide range of uses in foods, chemicals, and pharmaceuticals. Granular grades #4 and #5 are found in foods and doughnuts, cleaning compounds, pharmaceuticals, and many other products. Industrial grade sodium bicarbonate is used in diverse applications, including oil well drilling fluids, fire extinguishing materials, flue gas mitigation (for polution control), and water treatment. In some embodiments, the sodium bicarbonate product made may be subjected to sieving in order to remove fines (e.g., particle size of less than 45 microns or of a US mesh size of 325 or more) and/or to remove large particles (e.g., particle size of more than 300 microns or of less than a US mesh size 50).

In additional or alternate embodiments, the sodium bicarbonate product made by the present process may not be subjected to a grinding or milling operation which would impact its particle size distribution and/or particle shape.

The process according to the invention is particularly effective to produce a crystalline sodium bicarbonate product comprising poly-crystalline particles with a median diameter ($D_{50}$) of less than 300 microns. The mean diameter is preferably 275 microns or less, or 260 microns or less, or even 250 microns or less. The mean diameter may be at least 75 microns, or at least 100 microns, or at least 125 microns. The mean diameter being defined as $D_{50}$ which is the diameter such that half of the particles, in weight, have a diameter lower than the specified value. The mean diameter of the sodium bicarbonate product may be between 75 and 250 μm, preferably between 80 and 150 μm. $D_{10}$ diameters are preferably between 40 and 100 μm, whereas $D_{90}$ diameters are preferably between 175 and 500 μm. In a variant of such embodiment in which $D_X$ is the diameter value such that x percent of the particles have a diameter lower than the value. When the particles have an approximately spherical shape, the diameter is the diameter of the particle. For irregular shapes such as non spherical particles, the diameter is six times the volume of the particle divided by its outer surface (external area).

The optimum mean diameter of the particles forming the sodium bicarbonate product depends on the use for which it is intended. Accordingly, a particulate sodium bicarbonate product which is very suitable in the majority of applications in the present invention may have a mean particle diameter $D_{50}$ of between 80 and 300 microns, or between 100 and 250 microns, or between 120 and 240 microns. Preferred narrower ranges for $D_{50}$ may be from 130 to 190 microns, or even from 200 to 240 microns.

In a variant of such embodiment in which $D_X$ is the diameter value such that x percent of the particles have a diameter lower than the value, the particulate sodium bicarbonate product may have a $D_{10}$ diameter between 25 and 100 microns, preferably between 40 and 100 μm. Additionally or alternatively, the particulate sodium bicarbonate product may have a $D_{90}$ diameter between 175 and 500 μm, preferably between 250 and 450 μm.

The produced sodium bicarbonate is preferably in the form of a particulate powder but may contain a small weight fraction of fines, that is to say, of particles of less than 45 microns, such as those passing a size of U.S. mesh size of 325 (44 microns). In particular, preferably less than 10% by weight, more preferably less than 8% by weight, most preferably less than 5% by weight of the particles in the sodium bicarbonate product have a size of less than 45 microns (e.g., passing through a US mesh size of 325). Additionally or alternatively, preferably 8% by weight or less, more preferably 6% by weight or less, most preferably 5% by weight or less of particles in the particulate sodium bicarbonate product have a size of 37 microns or less (e.g., passing through a US mesh size of 400).

Positive impact on flowability of the crystalline sodium bicarbonate product has been observed.

According to the present invention, different variants of the process and/or of the product(s) obtained by said variants of the process are described in more detail below.

ITEM 1: A process for producing crystalline sodium bicarbonate, comprising:

feeding dried sodium bicarbonate solids with a mass flow rate to a fluid bed cooling unit, wherein said cooling unit comprises at least one cooling element through which flows a cooling fluid;

flowing a $CO_2$-containing gas in the fluid bed cooling unit to fluidize the dried sodium bicarbonate solids, in order for the dried sodium bicarbonate solids to be in thermal contact with the at least one cooling element;

withdrawing a sodium bicarbonate product from the fluid bed cooling unit; and adjusting the temperature of the cooling fluid flowing through the at least one cooling element in order for the sodium bicarbonate product to have an outlet temperature of 95° F. or less when being withdrawn from the fluid bed cooling unit.

ITEM 2: The process according to ITEM 1, further comprising:

providing sodium bicarbonate wet solids recovered from a crystallization step;

drying the sodium bicarbonate wet solids to produce the dried sodium bicarbonate solids being directed to the fluid bed cooling unit.

ITEM 3: The process according to ITEM 1, further comprising:

classifying the sodium bicarbonate product after being withdrawn from the fluid bed cooling unit to generate at least two sodium bicarbonate products of different average particle size.

ITEM 4: The process according to ITEM 1, wherein the $CO_2$-containing gas contains $CO_2$ and an inert gas.

ITEM 5: The process according to ITEM 1, wherein the $CO_2$-containing gas contains morethan 90% by vol of $CO_2$.

ITEM 6: The process according to ITEM 1, wherein the dried sodium bicarbonate solids fed to the fluid bed cooling unit have a temperature from 145° F. to 155° F.

ITEM 7: The process according to ITEM 1, wherein the sodium bicarbonate product have an outlet temperature of from 65° F. to less than 95° F.

ITEM 8: The process according to ITEM 1, wherein the cooling fluid is water or an aqueous solution.

ITEM 9: The process according to to any preceding ITEMS 1-8, wherein the cooling fluid is water or an aqueous solution at ambient temperature when the ambient temperature is 90° F. or less.

ITEM 10: The process according to any preceding ITEMS 1-9, wherein the cooling fluid has a temperature from 35° F. to 90° F.

ITEM 11: The process according to claim 1, wherein the cooling fluid is at ambient temperature, and wherein when the ambient temperature is higher than what is required to maintain the outlet temperature of the withdrawn sodium bicarbonate product to be 95 F or less, the cooling fluid is pre-cooled in a heat exchanger to decrease its temperature before it flows through the at least one cooling element.

ITEM 12: The process according to claim 1, wherein adjusting the temperature of the cooling fluid flowing through the at least one cooling element is dependent on at least one parameter selected from the group consisting of:
the mass flow rate of the dried solids,
the ambient temperature surrounding the fluid bed, and
the temperature of the CO2-containing gas entering the fluid bed cooling unit.

The present invention having been generally described, the following Examples are given as particular embodiments of the invention and to demonstrate the practice and advantages thereof. It is understood that the examples are given by way of illustration and is not intended to limit the specification or the claims to follow in any manner.

EXAMPLE

Sodium bicarbonate products were made according to a process operated using the system as illustrated in FIG. 1.

The crystallizer 10 was a reactive crystallizer in which a source of $CO_2$ (>98% vol $CO_2$) and a source of sodium carbonate (dissolved soda ash in water) were reacted to produce sodium bicarbonate crystals. The crystals were separated in the separation unit 20 which included hydrocyclones in series with a centrifuge. The recovered sodium bicarbonate crystals were then dried in the flash dryer 30. The dried sodium bicarbonate solids exiting the flash dryer at a temperature of 145 to 155° F. entered a baghouse used as the separate unit 40. The collected dried solids were fed by gravity flow to the fluid bed cooling unit 50 comprising tubes bundles 70 through which the cooling fluid 75 (water) flew through. A $CO_2$ gas stream at the bottom of the cooling unit unit 50 was used as the fluidization gas stream 55 and distributed via a distribution plate to fluidize the solids. The sodium bicarbonate product 80 was withdrawn from the cooling unit 50.

On Example 1, the fluid bed cooling unit 50 was at an average of 108° F. This test was carried out over a period of 3 months.

On Exanple 2, the fluid bed cooling unit 50 was maintained at an average of 78° F. This test was carried out over a period of 2.5 months. To adjust the temperature of the fluid bed cooling unit 50 to a temperatue less than ambient temperature in Example 2, water (cooling fluid 75) was pre-cooled before entering inside the tube bundles 70. The amount of pre-cooling performed on the water (cooling fluid 75) was largely dependent on the amount of solids load inside of the fluid bed cooling unit 50. Over the period of 2.5 months, the average ambient temperature was higher than 78° F.

The flowability of the sodium sodium bicarbonate product 80 was measured using an 'aged jar' method and was averaged over the entire testing period. An acceptable flowability in the aged jar method corresponds to a value of 1 or 1.25. A flowability of 1.5 or more is unacceptable.

The aged jar method determines the flowability of a sodium bicarbonate sample after resting for a period of time. This test is performed to help determine how the product will react after be stored in a silo or railcar. Flowability is determined by allowing a sample to sit for 10-14 days and then observing the flow and amount of clumps in the sample. It is a subjective tested rated between 1 and 3.

Figure 2:
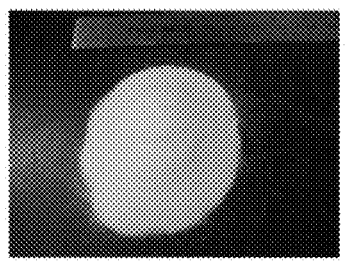
FIG. 2 provides pictures of 5 sodium bicarbonate powders of various aged flowability qualitative ratings from excellent (rating '1') to very poor (rating '3').
Figure 2:
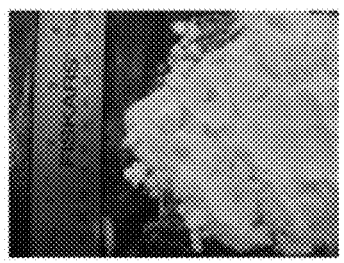
Figure 2:
Figure 2:
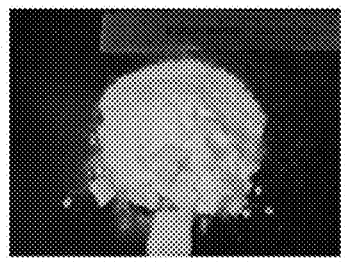
Figure 2:
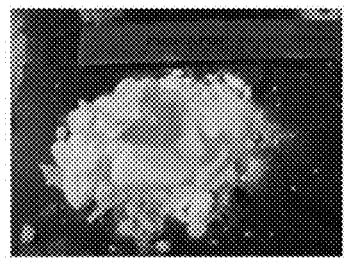

The procedure in the aged jar method is as follows:
1. Fill a 1-Liter Plastic bottle with a sodium bicarbonate sample (care should be taken not to pack the sample into the bottle).
2. Store the bottle undisturbed for 10-14 days.
3. Pour the contents out and observe the flow and presence of chunks.
4. Samples are rated from 1 to 3 in 0.25 increments.
Free flowing with no lumps is rated '1'.
Free flowing with 1-2 inch soft chunks is '2'.
A non-flowing sample that must be beaten out of the bottle and has 3-4 inch inch hard chunks is '3'. Pictures of examples of powders of flowability ratings '1', '1.5', '2', 2.5', and '3' are shown in FIG. 2.

|  | Ex. 1 | Ex 2 |
|---|---|---|
| Average Fluid Bed Cooling unit Temp. (° F.) | 108 | 78 |
| Average Sodium Bicarbonate Flowability* | 1.27 | 1.19 |
| % Batches with Acceptable Flowability | 66.2% | 82.8% |
| % Batches with Unacceptable Flowability | 33.8% | 16.8% |

*measured according to the aged jar method described below.

By using a fluid bed cooling unit temperature of less than 32.2° C. (<90° F.), the batches obtained in Example 2 (at 25.6° C.=78° F.) had a much higher percentage of acceptable flowability than the batches obtained in Example 1 (at 47.8° C.=118° F.).

This disclosure of all patent applications, and publications cited herein are hereby incorporated by reference, to the extent that they provide exemplary, procedural or other details supplementary to those set forth herein.

Should the disclosure of any of the patents, patent applications, and publications that are incorporated herein by reference conflict with the present specification to the extent that it might render a term unclear, the present specification shall take precedence.

In the application, where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components. Further, it should be understood that elements and/or features of an apparatus, a process, or a method described herein can be combined in a variety of ways without departing from the scope and disclosures of the present teachings, whether explicit or implicit herein.

The term 'comprising' includes 'consisting essentially of' and also "consisting of".

The phrase 'A and/or B' refers to the following selections: element A; or element B; or combination of elements A and B (A+B). The phrase 'A and/or B' is equivalent to at least one of A and B.

The phrase 'A1, A2, ... and/or An' with n≥3 includes the following choices: any single element Ai (i=1, 2, ... n); or any sub-combinations of from two to (n−1) elements chosen from A1, A2, ..., An; or combination of all elements Ai (i=1, 2, ... n). For example, the phrase 'A1, A2, and/or A3' refers to the following choices: A1; A2; A3; A1+A2; A1+A3; A2+A3; or A1+A2+A3.

In the present application, where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components. Any element or component recited in a list of elements or components may be omitted from such list. Further, it should be understood that elements, embodiments, and/or features of processes or methods described herein can be combined in a variety of ways without departing from the scope and disclosure of the present teaching, whether explicit or implicit herein.

The use of the singular 'a' or 'one' herein also includes the plural unless specifically stated otherwise.

A plurality of elements includes two or more elements.

In addition, if the term "about" or "ca." is used before a quantitative value, the present teachings also include the specific quantitative value itself, unless specifically stated otherwise. As used herein, the term "about" or "ca." refers to a +−10% variation from the nominal value unless specifically stated otherwise.

Accordingly, the scope of protection is not limited by the description set out above, but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention.

While preferred embodiments of this invention have been shown and described, modifications thereof can be made by one skilled in the art without departing from the spirit or teaching of this invention. The embodiments described herein are exemplary only and are not limiting. Many variations and modifications of systems and methods are possible and are within the scope of the invention.

We claim:

1. A process for producing crystalline sodium bicarbonate, comprising:
    feeding dried sodium bicarbonate solids with a mass flow rate to a fluid bed cooling unit, wherein said cooling unit comprises at least one cooling element through which flows a cooling fluid;
    flowing a fluidization gas stream in the fluid bed cooling unit to fluidize the dried sodium bicarbonate solids, in order for the dried sodium bicarbonate solids to be in thermal contact with the at least one cooling element;
    withdrawing a sodium bicarbonate product from the fluid bed cooling unit; and
    adjusting the temperature of the cooling fluid flowing through the at least one cooling element in order for the sodium bicarbonate product to have an outlet temperature of 95° F. or less when being withdrawn from the fluid bed cooling unit.

2. The process according to claim 1, further comprising:
    providing sodium bicarbonate wet solids recovered from a crystallization step;
    drying the sodium bicarbonate wet solids to produce the dried sodium bicarbonate solids being directed to the fluid bed cooling unit.

3. The process according to claim 1, further comprising:
    classifying the sodium bicarbonate product after being withdrawn from the fluid bed cooling unit to generate at least two sodium bicarbonate products of different average particle size.

4. The process according to claim 1, wherein the fluidization gas stream comprises $CO_2$.

5. The process according to claim 1, wherein the fluidization gas stream comprises more than 90% by vol of $CO_2$.

6. The process according to claim 1, wherein the fluidization gas stream comprises air.

7. The process according to claim 1, wherein the fluid bed cooling unit has a relative humidity of 40% or less.

8. The process according to claim 1, wherein the dried sodium bicarbonate solids fed to the fluid bed cooling unit have a temperature from 145° F. to 155° F.

9. The process according to claim 1, wherein the dried sodium bicarbonate solids fed to the fluid bed cooling unit have a moisture content of 1% or less.

10. The process according to claim 1, wherein the sodium bicarbonate product have an outlet temperature of from 65° F. to less than 95° F.

11. The process according to claim 1, wherein the cooling fluid flowing through the at least one cooling element is water or an aqueous solution.

12. The process according to to claim 1, wherein the cooling fluid flowing through the at least one cooling element is at ambient temperature when the ambient temperature is 90° F. or less.

13. The process according to claim 1, wherein the cooling fluid entering the at least one cooling element has a temperature from 35° F. to 90° F.

14. The process according to claim 1, wherein the cooling fluid entering the at least one cooling element is at ambient temperature, and wherein when the ambient temperature is higher than what is required to maintain the outlet temperature of the withdrawn sodium bicarbonate product to be 95° F. or less, the cooling fluid is pre-cooled in a heat exchanger to decrease its temperature before it flows through the at least one cooling element.

15. The process according to claim 1, wherein adjusting the temperature of the cooling fluid flowing through the at least one cooling element is dependent on at least one parameter selected from the group consisting of:
    the mass flow rate of the dried solids,
    the ambient temperature surrounding the fluid bed, and
    the temperature of the fluidization gas stream entering the fluid bed cooling unit.

* * * * *